United States Patent [19]

Rutz

[11] 4,295,690
[45] Oct. 20, 1981

[54] HYDROSTATIC BEARING FOR A RADIAL PISTON MACHINE

[76] Inventor: Peter Rutz, Brunnelihohestrasse 2, CH-8400 Winterthur, Switzerland

[21] Appl. No.: 116,492

[22] Filed: Jan. 29, 1980

[30] Foreign Application Priority Data

Mar. 1, 1979 [CH] Switzerland ............... 2029/79

[51] Int. Cl.³ ............................................. F16C 32/06
[52] U.S. Cl. ....................................... 308/9; 308/107; 308/DIG. 1
[58] Field of Search .................... 308/9, DIG. 1, 107, 308/73, 106, 126

[56] References Cited

U.S. PATENT DOCUMENTS

| 3,527,510 | 9/1970 | Christiansen | 308/107 |
| 4,030,784 | 6/1977 | King et al. | 308/107 |
| 4,206,953 | 6/1980 | Diehl et al. | 308/9 |

Primary Examiner—Lenard A. Footland

[57] ABSTRACT

A hydrostatic bearing for a radial piston machine includes a stationary pintle and a member rotatably mounted on the pintle, a bore in the pintle for high pressure flow, a hydrostatic bearing pocket in the surface, with a throttle and, the pintle has varying radii to its surface.

7 Claims, 2 Drawing Figures

HYDROSTATIC BEARING FOR A RADIAL PISTON MACHINE

This invention relates to a hydrostatic bearing for a radial piston machine.

As is known, radial piston machines have frequently been constructed with a stationary cylindrical pintle about which a member of the machine may rotate. In particular, in one known machine, the rotatable member is a side wall of an annular guide member which serves to guide and support a plurality of radially disposed pistons thereon. In addition, a hydrostatic bearing is formed between the outer surface of the pintle and an enclosing bore of the rotatable member. Further, both the outer surface of the pintle and the bore of the rotatable member are of circular cylindrical construction with the radii of the two cylindrical constructions differing from each other by a clearance which results in what may be termed a crescent effect. That is, the bearing gap between the pintle and the member widens out in the form of a crescent. This variation in the bearing gap, however, results in poor load-bearing characteristics of the hydrostatic bearing surface and also considerable oil losses. Further, the phenomena associated with the crescent effect are intensified if an uneven heating of the pintle and of the rotatable member or distortion occurs between the pintle and the member during operation of the bearing.

Accordingly, it is an object of the invention to improve the hydrostatic bearing of a radial piston machine.

It is another object of the invention to improve the load-bearing characteristics of a hydrostatic bearing in a radial piston machine.

Briefly, the invention is directed to a hydrostatic bearing for a radial piston machine which is comprised of a stationary cylindrical pintle and a member which is rotatably mounted on the pintle. In addition, the pintle has at least one bore for conducting a flow of high pressure medium, a hydrostatic bearing pocket in one surface thereof and a throttle communicating the bore with the bearing pocket in order to deliver a throttled flow of pressure medium thereto. The rotatable member has a circular cylindrical bore concentric to the surface of the pintle so as to surround the bearing pocket.

In accordance with the invention, the surface of the pintle in which the bearing pocket is located has a radius which is larger than the adjacent surfaces on either side of the bearing pocket and which is approximately equal to the radius of the circular cylindrical bore of the rotatable member.

By making the outer surface of the pintle with a larger radius in the region of the hydrostatic bearing pocket, the center point of the larger radius is made eccentric of the center point of the radius of the rest of the outer surface of the pintle. In fact, the center point of the larger radius of the outer surface of the pintle coincides approximately with the center point of the radius of the bore of the rotatable member. Consequently, the load-bearing characteristics of the hydrostatic pocket are no longer impaired by the crescent effect and the high oil losses are eliminated. The bearing clearance on the side of the pintle opposite the bearing pocket is also increased. Consequently, the total clearance of the bearing, i.e., the sum of the bearing clearance between the pintle and the rotatable member and the clearance between the hydrostatic bearing pocket and the adjacent part of the bore can be made so large that the variations in clearance between the bearing pocket and the surrounding bore such as occur in hydrostatic piston machines covering a very wide pressure range, e.g. from 100 to 1,000 bar, can be taken without any difficulty. This means that if the bearing clearance between the bearing pocket and the surrounding bore is large under low operating pressure, the pintle can no longer touch the bore on the side opposite the bearing pocket.

According to another aspect of the invention, in order to increase the bearing clearance on the side of the pintle opposite the bearing pocket, the outer surface of the pintle is also provided with a larger radius on that side, this larger radius preferably being equal to the radius in the region of the bearing pocket. A construction of this kind is advisable in bearings for hydrostatic piston machines operating with just one direction of rotation, such as is the case when the machine is used as a pump.

It is also advantageous to construct the pintle with two opposite flattened portions if the bearing is to be used in hydrostatic piston machines operated with varying direction of rotation, i.e., as a motor. In that case, the pintle is provided with a second hydrostatic bearing pocket which co-operates with the rotatable member and which is provided, via a throttle, with a second supply for the high-pressure medium. In this case, the outer surface of the pintle has the same radius in the region of the second pocket as in the region of the first bearing pocket. This configuration practically eliminates the crescent effect in the region of the second bearing pocket as well and also provides an adequate bearing clearance between the pintle and the surrounding bore of the rotatable member. This construction is particularly suitable for bearings in which a floating ring is mounted on the pintle, the ring in turn being mounted rotatably at the outer surface in a bore in the side wall of the annular guide member. A mounting of this kind is described in Swiss Patent No. 588 011.

These and other objects and advantages of the invention will become more apparent from the following detailed description taken in conjunction with the accompanying drawings in which.

Figure 1:
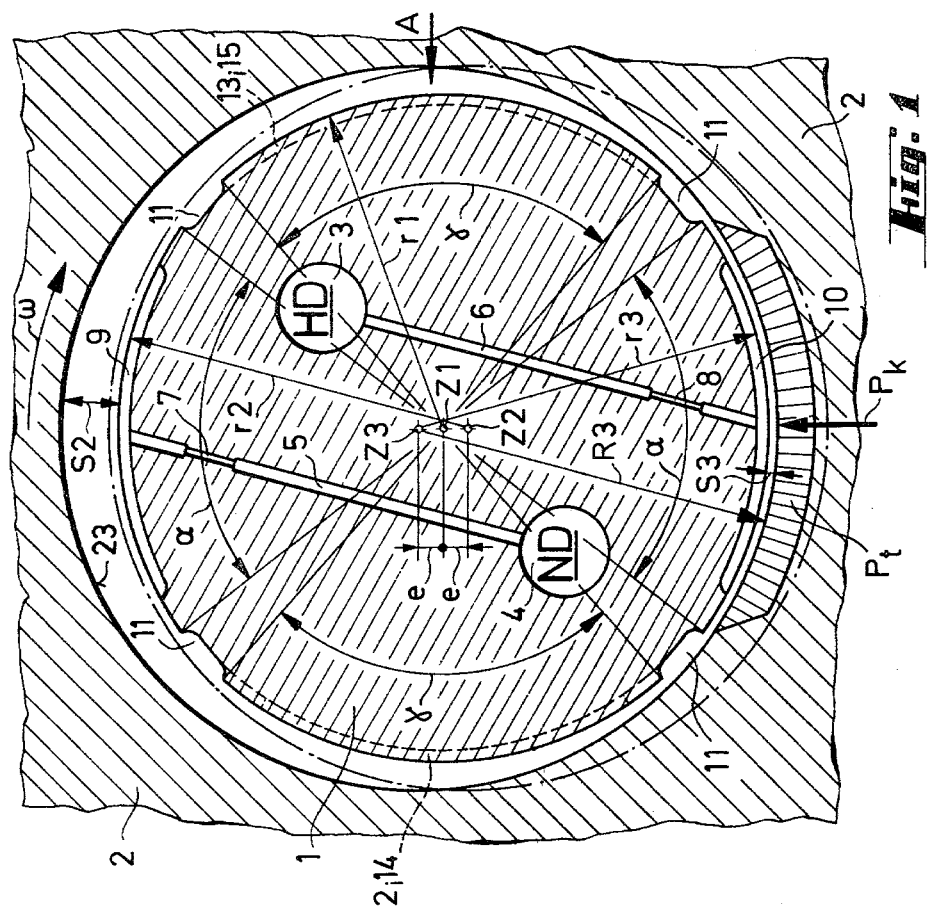
FIG. 1 illustrates a view taken on line I—I of FIG. 2.

Referring to FIG. 1, the hydrostatic bearing for a radial piston machine comprises a pintle 1 which is fixed in a housing (not shown) of the radial piston machine, and a member 2 which is rotatably mounted on the pintle 1. This member 2 forms a side wall of an annular guide member which serves to guide the feet of pistons which are radially guided in a cylinder block mounted on the pintle. A piston machine of this kind is further described in Swiss Patent No. 579,211 and no further description is believed to be necessary. As indicated, the member 2 has a bearing bore 23 which is of circular cylindrical shape with a radius R3.

The pintle 1 is intended for a machine having an alternating direction of rotation, i.e., to operate as a motor. Accordingly, the pintle 1 has two hydrostatic bearing pockets 9, 10 on opposite sides, which can be fed with throttled pressure medium alternately. To this end, each of the two pockets 9, 10 is connected via a duct 5, 6 respectively, containing a throttle 7, 8 respectively, to a bore 3, 4 respectively, extending axially through the pintle 1. One bore 3 acts as a feed duct for a high-pressure hydraulic pressure medium, while the other bore 4 acts as a discharge duct for the low-pressure medium. This arrangement of the high-pressure and low-pressure of the pressure medium applies on the assumption that the rotatable part 2 is moving in the direction indicated by the arrow ω in FIG. 1. In that case, the bearing pocket 10 comes into operation as will be described hereinafter. When the direction of rotation is reversed, the bore 3 carries pressure medium under low pressure and the bore 4 carries pressure medium under high pressure, so that the other bearing pocket 9 is then operative.

The two bearing pockets 10, 9 each extend over an angle α in the outer surfaces of the pintle 1. In addition, the outer surfaces of the pintle 1 over the angles α each have a radius r2, r3 larger than the radius r1 of the rest of the outer surface of the pintle 1 extending over the two angle zones γ. While the radius r1 has a center on the center Z1 of the pintle 1, the centers Z2, Z3 of the radii r2, r3 are eccentric of the center Z1.

Figure 2:
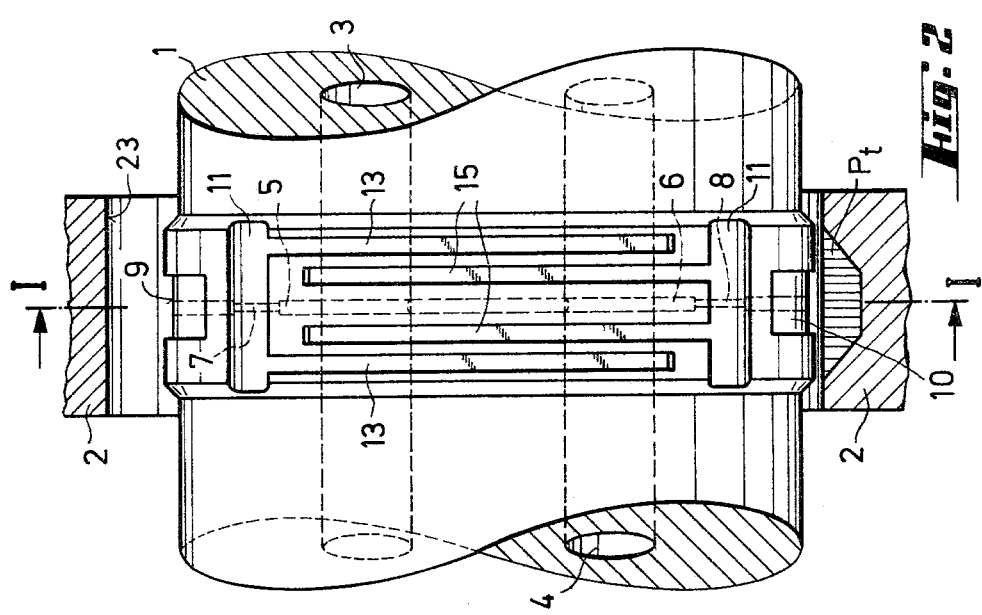
FIG. 2 illustrates an elevational view in part of a hydrostatic bearing constructed in accordance with the invention.

Referring to FIGS. 1 and 2, axial separating grooves 11 are provided in the pintle 1 on either side of the bearing pockets 9, 10 and hydrodynamic bearing pockets 12 to 15 extend peripherally from these grooves 11.

In the drawing, the radii r2, r3 and the eccentricity of their centers in relation to the center Z1 are shown on an exaggeratedly large scale. In a practical embodiment, the deviation of the radii r2, r3 from the radius r1 is a few hundredths of a millimeter. Since the raddi r2, r3 are larger than the radius r1, the former approximate the radius R3 of the bearing bore 23 of the rotatable member 2 so that a crescent-shaped gap is practically eliminated in the region of the bearing pockets 9, 10. This results in a reliable operation of the bearing over a wide pressure range, because the load-carrying capacity of the hydrostatic bearing pocket is no longer subject to any appreciable variations.

In the position of the rotatable member 2 in relation to the pintle 1 as shown in FIG. 1, the bearing pocket 10 is operative and the resultant force acting at the guide member 2 presses the member 2 from below in FIG. 1 against the pintle 1 with a force $P_k$. This force is counteracted by the hydraulic force $P_t$ supplied in the bearing pocket 10 by the high-pressure medium entering from the bore 3. The flattening of the pintle 1 in the region of the two bearing pockets 9 and 10 results in a relatively large clearance S2 at the top in FIG. 1, between the pintle 1 and the bore 23 of the rotatable member 2. This also promotes the operational reliability of the bearing, since the rotatable member 2 is reliably prevented from striking the top of the pintle 1 in the event of any changes in the bottom bearing clearance S3 due to variations in the machine operating pressure. The bearing clearance or gap S3 is thus smaller for a high pressure of the pressure medium than in the case of a low pressure.

If the direction of rotation of the machine is reversed, the bore 4 carries high-pressure medium and the bore 3 low-pressure medium. Accordingly, the force $P_k$ acts on the opposite side of the pintle 1 and the hydrostatic bearing pocket 9 comes into operation. This state is shown in FIG. 1 by the circular chain line illustrating the position of the bore 23 of the rotatable member 2.

Contrary to the exemplified embodiment described, it is possible to construct the pintle 1 with just one hydrostatic bearing pocket. This is advantageous if the machine on which the bearing is used is operated as a pump and is accordingly driven in only one direction of rotation. In that case, the side of the pintle 1 opposite the bearing pocket may also have a larger radius, which is advantageously equal to the larger radius in the region of the bearing pocket.

As a note, the term -ND- in FIG. 1 denotes low pressure while the term -HD- denotes high pressure.

What is claimed is:

1. A hydrostatic bearing for a radial piston machine, said bearing comprising
    a stationary cylindrical pintle having at least one bore therein for conducting a flow of high pressure medium, a hydrostatic bearing pocket in one surface thereof and a throttle communicating said bore with said bearing pocket to deliver a throttled flow of pressure medium thereto, said surface having a radius larger than the adjacent surfaces on either side of said bearing pocket; and
    a member rotatably mounted on said pintle, said member having a circular cylindrical bore of a radius approximately equal to said radius of said one surface.

2. A hydrostatic bearing as set forth in claim 1, wherein said pintle further includes a second bore for conducting a flow of high-pressure medium, a second hydrostatic bearing pocket in a further surface of a radius equal to said radius of said one surface, and a throttle communicating said second bore with said second bearing pocket for passage of a flow of pressure medium therebetween.

3. A hydrostatic bearing as set forth in claim 2, wherein said pintle has an axial separating groove on each side of each said bearing pocket and hydrodynamic bearing pockets extending peripherally from each said groove.

4. A hydrostatic bearing as set forth in claim 1, wherein said pintle has an axial separating groove on each side of each said bearing pocket and hydrodynamic bearing pockets extending peripherally from each said groove.

5. A hydrostatic bearing as set forth in claim 4, wherein said pintle has a surface opposite said bearing pocket of a radius equal to said radius of said one surface.

6. A hydrostatic bearing as set forth in claim 1, wherein said pintle has a surface opposite said bearing pocket of a radius larger than said radius of said adjacent surfaces.

7. A hydrostatic bearing as set forth in claim 1 which further comprises a floating bearing ring between said pintle and said member.

* * * * *

UNITED STATES PATENT AND TRADEMARK OFFICE
CERTIFICATE OF CORRECTION

PATENT NO. : 4,295,690

DATED : October 20, 1981

INVENTOR(S) : Peter Rutz

It is certified that error appears in the above—identified patent and that said Letters Patent is hereby corrected as shown below:

Column 3, line 31, change "raddi" to --radii--

Signed and Sealed this

Twenty-third Day of February 1982

[SEAL]

Attest:

GERALD J. MOSSINGHOFF

Attesting Officer

Commissioner of Patents and Trademarks